Figure 1:
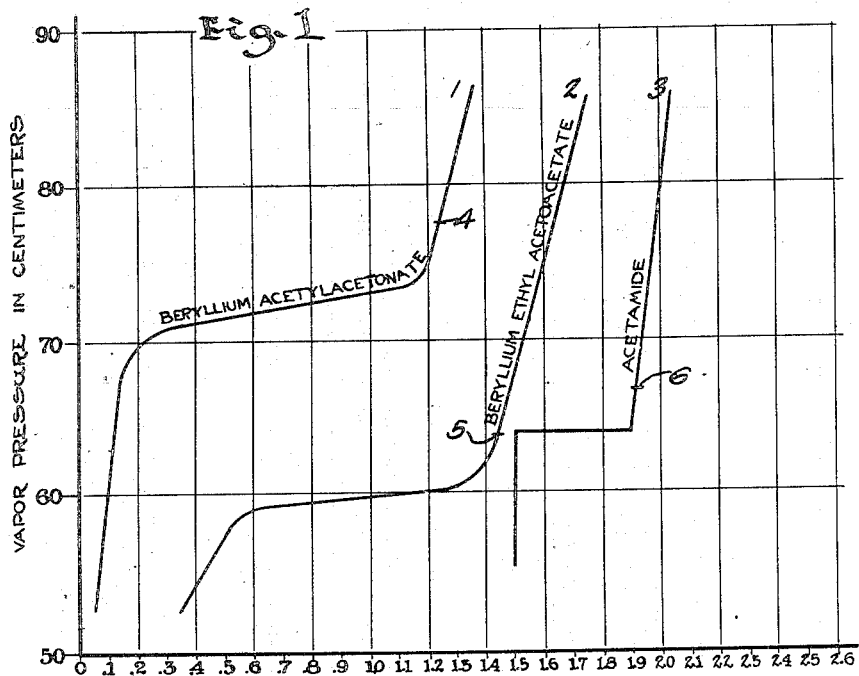

H. S. BOOTH
and G. G. TORREY
INVENTORS

Patented May 29, 1934

1,960,368

UNITED STATES PATENT OFFICE

1,960,368

ARTIFICIAL REFRIGERATION

Harold Simmons Booth and Gilberta G. Torrey, Cleveland Heights, Ohio

Application May 25, 1931, Serial No. 539,658

4 Claims. (Cl. 252—5)

This invention relates to artificial refrigeration and has for its main object the provision of a new, improved, and simplified absorption system so distinct from others as to constitute practically a new type, and characterized (a) by the use of sulphur dioxide as a working fluid;

(b) by the omission of rectifiers and inert gases.

The use of sulphur dioxide as a working fluid in artificial refrigerating systems is well-known, and highly advantageous particularly in small units such as those employed for domestic service, but these have been of the mechanical-compressor type and not of the absorption type, thereby exhibiting the disadvantages of leakage, wear, and lubrication difficulties. Due to the absence of moving parts the absorption system, which operates solely by virtue of temperature differences, exhibits attractive theoretical advantages, but the complexities attendant upon its practical operation are very great and require highly complicated apparatus, especially when the absorbent and the working fluid are both fluid and both easily vaporizable.

Our invention combines the advantages possessed by sulphur dioxide in respect of its convenient boiling point and its easy liquefaction at low pressures with little if any reduction below room temperature; and the advantages of an absorbent having only a low vapor pressure under normal operating temperatures so as to be readily separable from the working-fluid.

We have found that the following classes of substances have the property of absorbing sulphur dioxide successfully under normal temperature conditions and evolving it under a higher temperature without either decomposition or substantial vaporization.

1. Organic compounds of beryllium, especially those of so-called basic type; examples: basic acetate of beryllium, in general those compounds of the class described which can be heated without decomposition. The beryllium atom in the relation stated appears to behave as though linked between carbon and carbon and not as usual with other metals which constitute a part of organic salts.

2. Carbonyl compounds, especially those of the cyclic type (exclusive of the aryls), in so far as they exhibit the requisite requirements of a low vapor pressure. The carbonyl type includes the aldehydes, the ketones, the acid anhydrides and the amides. The more common aldehydes (like acetaldehyde) and the simpler ketones (like acetone) absorb $SO_2$ very vigorously and give most of it up at temperatures below boiling, although their vapor pressure is higher than that of some of the more desirable compounds hereafter described. The acid anhydrides like acetic anhydride can be used. The amides are particularly good but are considered under the next heading.

Those diketone compounds which are stable are good for the purpose, particularly beryllium beta-diketone derivatives which combine the virtues of the beryllium and of the carbonyl groups.

Camphor, which is a cyclic ketone, absorbs sulphur dioxide avidly and lends itself readily to these manipulations.

3. Amino groups. These are characterized by the $NH_2$ radical and its possessors are termed amides or amines, depending upon the nature of the attached groups. The amines of the aliphatic series (such as the methylamines and ethylamines) are volatile and commercially uncommon, but the amines of the aryl series have absorbent properties, e. g. aniline, diethyl-aniline, the toluidines, benzidine, etc.

The combinations of any two of the above groups exhibit still greater advantages, e. g. beryllium carbonyl compounds such as beryllium basic acetate, beryllium aceto acetonate, beryllium ethyl aceto acetate, etc., all of which are combinations between members of groups 1 and 2 above given; similarly as to groups 2 and 3, e. g. acetamide which contains a carbonyl group and a primary amide radical.

Figure 2:
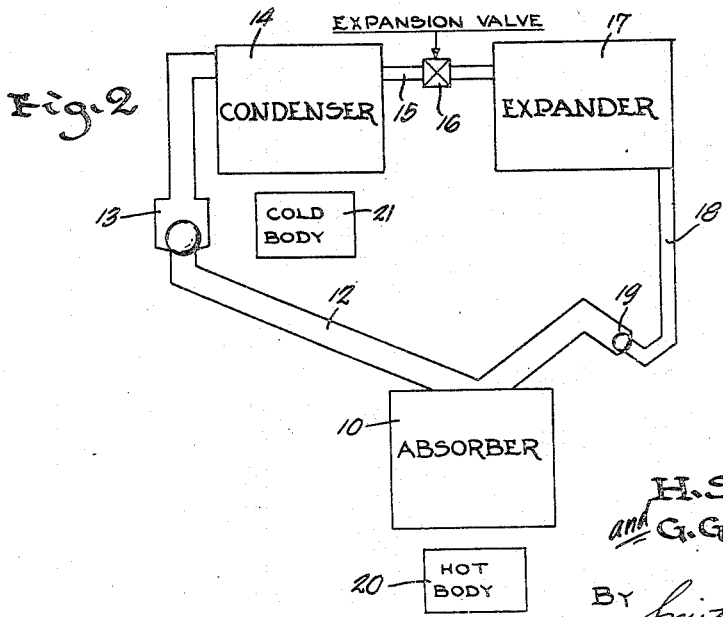

In the drawing we have shown in Fig. 1 a pressure-concentration equilibrium at constant temperature for three of the compounds mentioned; and in Fig. 2 a diagram of the cycle employed.

The temperature chosen for each of the equilibrium diagrams was 25° C. Each of the diagrams (and similarly for the other substances mentioned) exhibits a more or less horizontal portion throughout which the concentration in solution varies widely with comparatively little change in vapor pressure. This diagram has no direct implication upon the performance of the refrigerating cycle, but indicates the presence of a peculiar type of absorptive power and hence is a criterion of those substances which render such a cycle possible. Such equilibrium diagram taken at the temperature desired to be maintained in the absorber must show this horizontal step at a level not higher than the vapor pressure of sulphur dioxide at the temperature desired to be maintained in the expander. Practically any absorbent can be used where this step occurs at or below a pressure of 95 centimeters of mercury which corresponds to an expander temperature of —5° C. although we prefer an absorbent wherein this step occurs at a lower pressure so as to enable the production of a lower temperature in the expander. It is well known that at a pressure of 76 centimeters of mercury sulphur dioxide boils at —10° C., which is a better temperature. At a pressure of 60 centimeters of mercury the boiling point is —15° C.

The cycle employed is the well-known absorption cycle, but for purposes of completeness the same is set forth here with reference to the accompanying drawing which shows a purely diagrammatic layout. The absorber 10 is duly charged with the absorbing material and the sulphur dioxide is introduced until a pressure gauge connected to the system indicates a pressure corresponding to some point on the equilibrium diagram somewhat above the horizontal portion of the curve, as indicated at 4, 5, or 6. A pipe 12 leads from the absorber via check-valve 13 to the condenser 14, whence a pipe 15 provided with expansion-valve 16 leads to the expander 17. Thence a pipe 18 returns to the absorber through a valve 19 which opens in the opposite direction from the valve 13, which is to say: that pressure in the absorber, 10 tends to close valve 19 and to open valve 13. Heat, typified by the hot-body 20, applied to the absorber drives the sulphur dioxide into the condenser 14 at such pressure that the fluid is condensed by the "cold-body 21". The hot-body 20 can conveniently be a gas-flame, but can even better be a hot liquid such as hot water; while the cold-body 21 can be a liquid such as water but air alone if reasonably circulated is also satisfactory. The sulphur dioxide is largely driven off from the absorbents mentioned at temperatures below the boiling point of water, for instance at 80° C.; and the gas can be condensed readily at room temperature e. g. at 25° C., although lower temperatures are preferable where obtainable though not at all necessary.

It will be understood that the system is entirely closed so that atmospheric conditions have no effect thereon, but the system is adjusted to operate at whatever pressure is characteristic of the absorbent used. Thus if beryllium ethyl acetoacetate be employed (see Fig. 1, diagram 2,), the pressure produced in the absorber at a temperature of 25° C. will be that of 60 centimeters of mercury; this in turn constitutes the lowest pressure obtainable in the expander which is connected directly thereto, and indicates a temperature therein of —15° C. which is the boiling point of sulphur dioxide at that pressure. If beryllium acetyl acetonate were employed as shown in Fig. 1, diagram 1, the lowest temperature obtainable in the expander would be that corresponding to the boiling point of sulphur dioxide at 73 centimeters of mercury which is about —11° C.

All these absorbents exhibit the considerable practical advantage of evolving a considerable proportion of the sulphur dioxide upon rather gentle heating, e. g. 80° C., although for certain practical purposes as to produce a sufficiently high pressure in the condenser to produce ready liquefaction we prefer in actual operation to employ somewhat higher temperatures. This means that only a small amount of sensible heat is carried by the refrigerant, danger of explosion and decomposition is minimized, and heat-leakage is small. Furthermore the preferred absorbents are solid when pure, though all are liquid when impregnated with sulphur dioxide; this liquid condition greatly facilitates the application of heat thereto while the normal solid nature of the absorbent obviates all difficulties regarding separation. Those absorbents mentioned which are themselves liquid (e. g. aniline, acetic anhydride) have such high boiling points and such low vapor pressures at working temperatures that separation difficulties are not troublesome.

It will be understood that this invention is not limited to certain specific chemical compounds but relates to a fair number of different compounds, characterized by a peculiar behavior with sulphur dioxide and identifiable by such behavior as constituting successful absorbents for use in a refrigerating cycle, and we accordingly claim the invention from this broader standpoint and without limiting ourselves except as specifically recited in our several claims which we desire may be construed each according to its own limitations and without reference to limitations contained in other claims.

Having thus described our invention what we claim is:

1. A chemical system for an absorption type refrigerator comprising sulphur dioxide as a refrigerant medium and an organic beryllium compound as an absorption medium.

2. A chemical system for an absorption type refrigerator comprising sulphur dioxide as a refrigerant medium and an organic beryllium compound having a carbonyl grouping as an absorption medium.

3. A chemical system for an absorption type refrigerator comprising sulphur dioxide as a refrigerant medium and beryllium acetyl acetonate as an absorption medium.

4. A chemical system for an absorption type refrigerator comprising sulphur dioxide as a refrigerant medium and beryllium ethyl acetoacetate as an absorption medium.

HAROLD SIMMONS BOOTH.
GILBERTA G. TORREY.